United States Patent
Wan et al.

(10) Patent No.: US 12,416,832 B2
(45) Date of Patent: Sep. 16, 2025

(54) BACKLIGHT SOURCE, DISPLAY DEVICE, AND METHOD FOR PARTITION CONTROL

(71) Applicant: HKC CORPORATION LIMITED, Guangdong (CN)

(72) Inventors: Ye Wan, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 8 days.

(21) Appl. No.: 18/338,004

(22) Filed: Jun. 20, 2023

(65) Prior Publication Data
US 2024/0142822 A1   May 2, 2024

(30) Foreign Application Priority Data
Nov. 1, 2022 (CN) .......................... 202211353141.2

(51) Int. Cl.
| | |
|---|---|
| G02F 1/13357 | (2006.01) |
| G02F 1/1335 | (2006.01) |
| G09F 13/30 | (2006.01) |
| G09F 19/12 | (2006.01) |
| G09G 3/00 | (2006.01) |
| G09G 3/32 | (2016.01) |

(52) U.S. Cl.
CPC .. *G02F 1/133608* (2013.01); *G02F 1/133613* (2021.01); *G09G 3/005* (2013.01); *G09F 13/30* (2013.01); *G09F 19/12* (2013.01); *G09G 3/32* (2013.01); *G09G 2320/0626* (2013.01)

(58) Field of Classification Search
CPC ........ G02F 1/133608; G02F 1/133613; G09G 3/32; G09G 3/005; G09G 2320/0626; G09F 13/30; G09F 19/12

USPC ............................................................ 345/31
See application file for complete search history.

(56) References Cited

U.S. PATENT DOCUMENTS

| | | | | |
|---|---|---|---|---|
| 2015/0124192 | A1* | 5/2015 | Takahashi | G09G 3/3611 349/58 |
| 2017/0030550 | A1* | 2/2017 | Popovich | G02B 5/32 |
| 2017/0310956 | A1* | 10/2017 | Perdices-Gonzalez | G09G 3/2092 |

FOREIGN PATENT DOCUMENTS

| | | |
|---|---|---|
| CN | 102798093 A | 11/2012 |
| CN | 109407408 A | 3/2019 |
| CN | 110032002 A | 7/2019 |
| CN | 111489709 A | 8/2020 |
| CN | 112068355 A | 12/2020 |

(Continued)

OTHER PUBLICATIONS

WIPO, International Search Report and Written Opinion for International Application No. PCT/CN2023/097380, Aug. 17, 2023.

(Continued)

*Primary Examiner* — Kwin Xie
(74) *Attorney, Agent, or Firm* — HAUPTMAN HAM, LLP (57) ABSTRACT

A backlight source, a display device, and a method for partition control are provided. The backlight source includes a lamp panel and multiple light-emitting elements disposed on the lamp panel and electrically connected to the lamp panel. The backlight source further includes a transmission member fixedly connected to the lamp panel. The transmission member is configured to rotatably drive the lamp panel to rotate at a preset rotation rate, to make the lamp panel drive the multiple light-emitting elements to rotate at the preset rotation rate, to form a surface light source.

18 Claims, 6 Drawing Sheets

(56) References Cited

FOREIGN PATENT DOCUMENTS

| | | | | |
|---|---|---|---|---|
| CN | 115047674 | A | 9/2022 | |
| CN | 115327820 | A | 11/2022 | |
| JP | 2006024383 | A | 1/2006 | |
| JP | 2006047931 | A | 2/2006 | |
| JP | 2016500450 | A * | 1/2016 | ........... G02B 27/017 |
| WO | WO-2017221945 | A1 * | 12/2017 | ............. B60R 11/04 |

OTHER PUBLICATIONS

The first office action issued in corresponding CN application No. 202211353141.2 dated Dec. 5, 2022.

* cited by examiner

BACKLIGHT SOURCE, DISPLAY DEVICE, AND METHOD FOR PARTITION CONTROL

CROSS-REFERENCE TO RELATED APPLICATIONS

This application claims priority under 35 U.S.C. § 119(a) to Chinese Patent Application No. 202211353141.2, filed Nov. 1, 2022, the entire disclosure of which is incorporated herein by reference.

TECHNICAL FIELD

This application relates to the field of display technology, and more particularly to a backlight source, a display device with the backlight source, and a method for partition control for the display device.

BACKGROUND

Currently, display panels of Liquid Crystal Displays (LCD) equipped with mini Light-Emitting Diode (LED) display devices capable of partition backlight are increasingly popular. Currently, most mini LED display devices in the market use fixed mini LED lamp beads, and one or more lamp beads are generally disposed in each partition of a backlight structure.

However, to achieve that partition backlight reaches stable contrast, a large number of partitions are usually required to be defined in the backlight structure, and a large number of lamp beads are required in each partition, resulting in a significant increase in manufacturing costs and power consumption of the display device.

SUMMARY

In a first aspect, a backlight source is provided in the disclosure. The backlight source includes a lamp panel and multiple light-emitting elements disposed on the lamp panel and electrically connected to the lamp panel. The backlight source further includes a transmission member fixedly connected to the lamp panel. The transmission member is configured to rotatably drive the lamp panel to rotate at a preset rotation rate, to make the lamp panel drive the multiple light-emitting elements to rotate at the preset rotation rate, to form a surface light source.

In a second aspect, a display device is provided in the disclosure. The display device includes a backlight module and a display panel. The backlight module is configured to provide light for display. The backlight module includes an optical regulating assembly, a back panel, a driving assembly, and at least one backlight source. The at least one backlight source is disposed on the back panel. The at least one backlight source each includes a lamp panel, multiple light-emitting elements disposed on the lamp panel and electrically connected to the lamp panel, a transmission member fixedly connected to the lamp panel. The transmission member is configured to rotatably drive the lamp panel to rotate at a preset rotation rate, to make the lamp panel drive the multiple light-emitting elements to rotate at the preset rotation rate, to form a surface light source. The optical regulating assembly is disposed at a light-exiting side of the at least one backlight source and configured to regulate a light-emitting angle of the at least one backlight source. The driving assembly is configured to drive the at least one backlight source to rotate at the preset rotation rate. The display panel is disposed at a light-exiting side of the backlight module.

In a third aspect, a method for partition control is provided in the disclosure. The method for partition control is performed by a display device including a driving assembly, a lamp panel, a backlight driving circuit, multiple light-emitting elements, and a display panel. The method includes: obtaining a brightness signal and an adaptation signal corresponding to an image to-be-displayed; driving, with the driving assembly, the lamp panel to rotate at a preset rotation rate and driving, with the backlight driving circuit, the multiple light-emitting elements on the lamp panel, according to the brightness signal; and displaying, with the display panel, the image according to the adaptation signal and partition light emission of the multiple light-emitting elements on the lamp panel.

BRIEF DESCRIPTION OF THE DRAWINGS

To illustrate technical solutions of implementations of the disclosure more clearly, the following will give a brief introduction to accompanying drawings required for illustrating implementations. Apparently, the accompanying drawings hereinafter described merely illustrate some implementations of the disclosure. Based on these drawings, those of ordinary skills in the art can also obtain other drawings without creative effort.

DETAILED DESCRIPTION

To facilitate understanding of the disclosure, a detailed description will be given with reference to relevant accompanying drawings. The accompanying drawings illustrate some exemplary implementations of the disclosure. However, the disclosure can be implemented in many different forms and is not limited to the implementations described herein. On the contrary, these implementations are provided for a more thorough and comprehensive understanding of the disclosure.

Illustration of the following implementations is provided with reference to the accompanying drawings to exemplarily illustrate specific implementations that can be implemented in the disclosure. Sequence numbers for components recited herein, such as "first", "second", etc., are used merely to distinguish described objects and do not have any sequence or technical meaning. The terms "connecting" and "coupling" in the disclosure, unless specified otherwise, both include direct connection and indirect connection (coupling). In the disclosure, directional terms mentioned herein, such as "on", "under", "front", "back", "left", "right", "in", "out", "side", etc., indicate only directions with reference to the accompanying drawings, and the directional terms used are for better and clearer illustration and understanding of the disclosure, rather than explicitly or implicitly indicate that apparatuses or elements referred to herein must have a certain orientation or be configured and operated in a specific orientation and therefore cannot be understood as limitations to the disclosure.

In illustration of the disclosure, it needs to be noted that, unless stated otherwise, terms "installing", "coupling", and "connecting" referred to herein can be understood in broader sense. For example, they may include a fixed coupling, a removable coupling, or an integrated coupling; they may include a mechanical coupling; they may include a direct coupling, an indirect coupling through a medium, or an interconnection between two components. For those of ordinary skill in the art, the above terms in the disclosure can be understood according to specific situations. It needs to be noted that the terms "first", "second", and the like used in the specification, the claims, and the accompany drawings of the disclosure are used to distinguish different objects rather than describe a particular order. In addition, the term "include", "may include", "contain", or "may include" used herein indicates the existence of a corresponding function, operation, element, or the like disclosed, and does not limit one or more other functions, operations, elements, etc. In addition, the term "includes" or "including" means that there are corresponding features, numbers, steps, operations, elements, components, or a combination thereof disclosed in the specification, and does not exclude the existence or addition of one or more other features, numbers, steps, operations, elements, components, or a combination thereof, which is intended to cover a non-exclusive inclusion. It should also be understood that the meaning of "at least one" described herein is one and more than one, e.g., one, two, three, and the meaning of "multiple" or "multiple" is at least two, e.g., two or three, unless specifically defined otherwise. The terms "step 1", "step 2", and the like in the specification, claims, and drawings of the disclosure are used for distinguishing different objects, rather than for describing a specific order.

In view of deficiencies of the related art, a backlight source, a display device, and a method for partition control are provided in the disclosure, where a driving assembly is configured to drive light-emitting elements of the backlight source to rotate at a high speed, and a backlight driving circuit is configured to adjust on/off or brightness/darkness of the light-emitting elements according to positions of different light-emitting elements, to achieve large-area backlight with a small number of light-emitting elements, so that a large number of light-emitting elements are not required, thereby effectively reducing manufacturing costs and power consumption of a backlight module.

In a first aspect, a backlight source is provided in the disclosure. The backlight source includes a lamp panel and multiple light-emitting elements disposed on the lamp panel and electrically connected to the lamp panel. The backlight source further includes a transmission member fixedly connected to the lamp panel. The transmission member is configured to rotatably drive the lamp panel to rotate at a preset rotation rate, to make the lamp panel drive the multiple light-emitting elements to rotate at the preset rotation rate, to form a surface light source.

In some implementations, the multiple light-emitting elements are arranged in an array on the lamp panel at intervals of a preset distance, and the preset rotation rate is greater than or equal to 12 Hz.

In some implementations, the multiple light-emitting elements are arranged in an X*N array on the lamp panel, where X and N each are a positive integer greater than or equal to 1, and N is 20 to 30 times X.

In some implementations, the backlight source forms a partition-controlled surface light source.

In a second aspect, a display device is provided in the disclosure. The display device includes a backlight module and a display panel. The backlight module is configured to provide light for display. The backlight module includes an optical regulating assembly, a back panel, a driving assembly, and at least one backlight source. The at least one backlight source is disposed on the back panel. The at least one backlight source each includes a lamp panel, multiple light-emitting elements disposed on the lamp panel and electrically connected to the lamp panel, a transmission member fixedly connected to the lamp panel. The transmission member is configured to rotatably drive the lamp panel to rotate at a preset rotation rate, to make the lamp panel drive the multiple light-emitting elements to rotate at the preset rotation rate, to form a surface light source. The optical regulating assembly is disposed at a light-exiting side of the at least one backlight source and configured to regulate a light-emitting angle of the at least one backlight source. The driving assembly is configured to drive the at least one backlight source to rotate at the preset rotation rate. The display panel is disposed at a light-exiting side of the backlight module.

In some implementations, each backlight source forms a partition-controlled surface light source, or multiple backlight sources cooperatively form a partition-controlled surface light source.

In some implementations, the multiple light-emitting elements are arranged in an array on the lamp panel at intervals of a preset distance, and the preset rotation rate is greater than or equal to 12 Hz.

In some implementations, the backlight module includes one backlight source, and the driving assembly includes a driving motor. The driving motor is rotatably connected to an end of the transmission member of the backlight source away from the lamp panel. The driving motor is configured to drive the transmission member to rotate at the preset rotation rate, to make the transmission member drive rotation of the lamp panel of the backlight source.

In some implementations, the backlight module includes multiple backlight sources arranged in an array, and a phase difference between two adjacent backlight sources is $\pi/2$. An interval between rotation axes of two adjacent backlight sources is greater than a rotation radius of the backlight source, and less than or equal to $\sqrt{2}$ times the rotation radius of the backlight source.

In some implementations, the driving assembly includes multiple driving motors, where each of the multiple driving motors is rotatably connected to an end of a corresponding transmission member away from the lamp panel, and each of the multiple driving motors is configured to drive a corresponding transmission member to rotate at the preset rotation rate, to make the transmission member drive rotation of a lamp panel of a corresponding backlight source.

In some implementations, the backlight module includes multiple backlight sources, and the driving assembly includes a gear transmission set and a driving motor, where the gear transmission set includes multiple gears, and the driving motor is configured to drive the gears of the gear transmission set to mesh with each other and rotate, to make each gear drive a corresponding transmission member to rotate at the preset rotation rate, and further make the transmission member drive a corresponding lamp panel to rotate at the preset rotation rate.

In some implementations, the backlight module further includes a backlight driving circuit disposed on the lamp panel and electrically connected to the light-emitting elements of the at least one backlight source, and the backlight driving circuit is configured to selectively control the light-emitting elements for partition light emission.

In some implementations, the backlight source includes m light-emitting elements, and the transmission member is provided with n concentric-circular connectors, where m and n satisfy n=m+1.

In some implementations, each of m light-emitting elements has a first electrode and a second electrode, where first electrodes of the m light-emitting elements each are electrically connected to a first concentric-circular connector on the transmission member, and second electrodes of the m light-emitting elements each are electrically connected to a correspondingly concentric-circular connector of the n concentric-circular connectors other than the first concentric-circular connector.

In some implementations, the backlight module further includes a structural cover, and the structural cover is disposed at the light-exiting side of the at least one backlight source of the backlight module.

In some implementations, the backlight module further includes a guiding block disposed on a side surface of the lamp panel of the at least one backlight source away from the light-emitting elements. The guiding block is configured to transfer heat generated by the display panel to the outside of the display device.

In some implementations, the backlight module further includes a support assembly, the support assembly is configured to adjust a distance between the optical regulating assembly and the at least one backlight source.

In a third aspect, a method for partition control is provided in the disclosure. The method for partition control is performed by a display device including a driving assembly, a lamp panel, a backlight driving circuit, multiple light-emitting elements, and a display panel. The method includes: obtaining a brightness signal and an adaptation signal corresponding to an image to-be-displayed; driving, with the driving assembly, the lamp panel to rotate at a preset rotation rate and driving, with the backlight driving circuit, the multiple light-emitting elements on the lamp panel, according to the brightness signal; and displaying, with the display panel, the image according to the adaptation signal and partition light emission of the multiple light-emitting elements on the lamp panel.

In some implementations, the brightness signal includes brightness information, timing, and position information corresponding to each of the multiple light-emitting elements, and driving the multiple light-emitting elements on the lamp panel according to the brightness signal includes: driving on/off or brightness/darkness of the multiple light-emitting elements according to the brightness information, the timing, and the position information corresponding to each of the multiple light-emitting elements.

In some implementations, the brightness signal includes timing and position information corresponding to each of the multiple light-emitting elements, and driving the lamp panel to rotate at the preset rotation rate according to the brightness signal includes: driving the lamp panel to rotate at the preset rotation rate according to the timing and the position information corresponding to each of the multiple light-emitting elements.

To sum up, the backlight source includes the lamp panel and the multiple light-emitting elements disposed on the lamp panel. The driving assembly is configured to drive the light-emitting elements to rotate at the high speed, and the backlight driving circuit is configured to adjust on/off or brightness/darkness of different light-emitting elements according to positions of different light-emitting elements, to achieve large-area backlight with a small number of light-emitting elements. Meanwhile, it is possible to reach display brightness of the display device with a small number of light-emitting elements, and a large number of light-emitting elements are not required for partition control, thereby effectively reducing manufacturing costs and power consumption of the backlight module.

Figure 1:
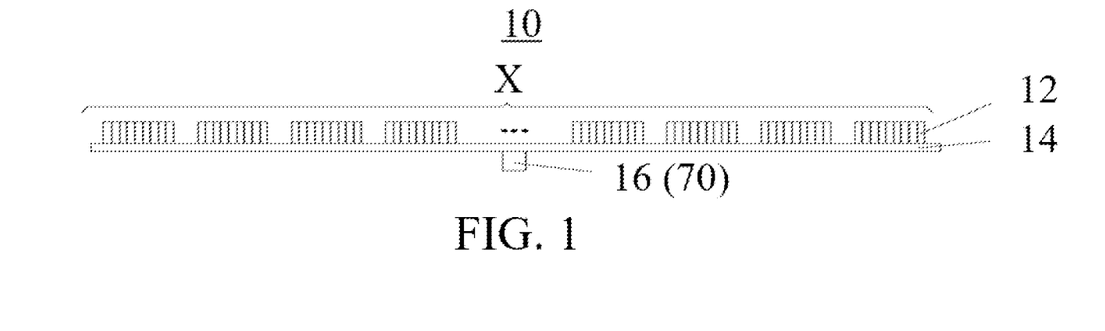
FIG. 1 is a schematic structural view of a backlight source at a certain angle disclosed in implementations of the disclosure.

Referring to FIG. 1, FIG. 1 is a schematic structural view of a backlight source at a certain angle disclosed in implementations of the disclosure. As illustrated in FIG. 1, a backlight source 10 provided in implementations of the disclosure includes multiple light-emitting elements 12, a lamp panel 14, and a transmission member 16. The multiple light-emitting elements 12 are disposed on the lamp panel 14 and electrically connected to the lamp panel 14. The lamp panel 14 is fixedly connected to the transmission member 16. The transmission member 16 is configured to rotatably drive the lamp panel 14 to rotate at a preset rotation rate, to make the lamp panel 14 drive the multiple light-emitting elements 12 to rotate at the preset rotation rate in a light-emitting phase, thereby forming a surface light source with multiple partitions. The multiple partitions can emit light simultaneously or separately, and a single light-emitting element in each partition may also separately emit light.

As illustrated in FIG. 1, "X" indicates the number of rows of the light-emitting elements 12 disposed on the lamp panel 14, i.e., X rows of light-emitting elements 12 are disposed on the lamp panel 14. X may be a positive integer greater than 0, which is not specifically limited in the disclosure.

In implementations of the disclosure, the multiple light-emitting elements 12 are arranged on the lamp panel 14 at intervals of a preset distance.

In a specific implementation of the disclosure, the surface light source may be a concentric-circular surface light source. Specifically, each light-emitting element 12 on the lamp panel 14 rotates to form a halo, and multiple halos formed by rotation of the multiple light-emitting elements 12 on the lamp panel 14 have the same center, thereby forming the concentric-circular surface light source.

It can be understood that, in the backlight source 10, more light-emitting elements 12 on the lamp panel 14 are driven to emit light, and the surface light source is brighter. Accordingly, more light-emitting elements 12 are disposed on the lamp panel 14 and more evenly distributed, i.e., the preset distance is smaller, and light exited is more even.

In a specific implementation of the disclosure, the lamp panel 14 may be a strip-shaped or panel-shaped structure, and the lamp panel 14 may be a Metal Core Printed Circuit Board (MCPCB). Since the MCPCB has characteristics of good viscoelastic performance, strong thermal aging resistance, and bearing relatively great mechanical stress and thermal stress, the lamp panel 14 made of an MCPCB can make a structure of the backlight source 10 more stable, which is beneficial to prolonging a service life of the backlight source 10. It can be understood that, the lamp panel 14 may also be other types of PCBs, as long as it is ensured that the lamp panel 14 can achieve its function under high-speed rotation, which is not specifically limited in the disclosure.

In a specific implementation of the disclosure, the multiple light-emitting elements 12 may be evenly distributed on the lamp panel 14 at intervals of the preset distance. When the multiple light-emitting elements 12 rotate at the preset rotation rate and are in a light-emitting state, a surface light source with even light emission can be obtained. In an implementation of the disclosure, the multiple light-emitting elements 12 may be arranged in an array on the lamp panel 14 at intervals of the preset distance, and electrically connected to the lamp panel 14.

In a specific implementation of the disclosure, the transmission member 16 includes two opposite ends, where one end of the transmission member 16 is fixedly connected to the lamp panel 14, and the other end of the transmission member 16 is rotatably connected to a driving assembly 50 (see FIG. 3) for driving rotation of the transmission member 16. The driving assembly 50 is configured to drive rotation of the transmission member 16, so as to drive rotation of the lamp panel 14. Specifically, the transmission member 16 may be a rotation column. In this case, one end of the rotation column is fixedly connected to the lamp panel 14, and the other end of the rotation column is rotatably connected to the driving assembly 50 for driving rotation of the rotation column.

In a specific implementation of the disclosure, the light-emitting element 12 has a first electrode and a second electrode. The first electrode may be an anode of the light-emitting element 12, and the second electrode may be a cathode of the light-emitting element 12, which is not specifically limited in the disclosure.

In a specific implementation of the disclosure, the light-emitting element 12 may be a mini Light-Emitting Diode (LED).

It can be understood that, whether the light-emitting element 12 emits light and the brightness of the light-emitting element 12 during light emission are controlled and adjusted by a backlight driving circuit 60 (see FIG. 3), where the backlight driving circuit 60 may be disposed on the lamp panel 14. Moreover, each light-emitting element 12 can be controlled separately, and electrical connection between the backlight driving circuit 60 and the light-emitting elements 12 is not interrupted when the lamp panel 14 rotates. As such, the multiple light-emitting elements 12 can rotate at the preset rotation rate under driving of the transmission member 16, so that point light sources can be transformed into a concentric-circular surface light source. Based on rotation of the lamp panel 14 at the preset rate, partition adjustment of on/off or brightness/darkness of the light-emitting elements 12 is performed according to positions of different light-emitting elements 12 in a display image, partition of large-area backlight can be achieved with a small number of light-emitting elements 12, and costs and power consumption of the light-emitting elements 12 are lower.

The transmission member 16 may also be electrically connected to the light-emitting elements 12 and the backlight driving circuit 60, to make the backlight driving circuit drive selective partition light emission of the light-emitting elements 12. Specifically, the transmission member 16 is provided with multiple concentric-circular connectors 70 (see FIG. 1), and the light-emitting elements 12 are electrically connected to the backlight driving circuit 60 on the lamp panel 14 through the concentric-circular connectors 70. The number n of concentric-circular connectors 70 on the transmission member 16 is one more than the number m of light-emitting elements 12 disposed on the lamp panel 14 and connected to the concentric-circular connectors 70. That is, the number n of concentric-circular connectors=the number m of light-emitting elements 12+1.

In a specific implementation of the disclosure, first electrodes of the multiple light-emitting elements 12 each are electrically connected to the same concentric-circular connector 70 on the transmission member 16, and the first electrodes of the multiple light-emitting elements 12 are electrically connected to a first power-supply of the backlight driving circuit 60 through the concentric-circular connector 70. Second electrodes of the multiple light-emitting elements 12 each are electrically connected to a correspondingly concentric-circular connector 70 on the transmission member 16, and the second electrodes of the multiple light-emitting elements 12 each are electrically connected to a second power-supply of the backlight driving circuit 60 through the concentric-circular connectors 70.

Furthermore, the backlight driving circuit 60 can selectively control the second electrodes of the light-emitting elements 12 to be electrically connected to or disconnected from the second power-supply, to drive selective partition light emission of the light-emitting elements 12. A voltage of the first power-supply is greater than that of the second power-supply, which is not specifically limited in the disclosure.

In a specific implementation of the disclosure, the concentric-circular connectors 70 may be arranged around an external peripheral side surface of the rotation column. Due to connectivity of the concentric-circular connectors 70, i.e., the concentric-circular connectors 70 are arranged around the peripheral side surface of the rotation column, when the lamp panel 14 rotates along with the rotation column, the light-emitting elements 12 can be stably electrically connected to the backlight driving circuit 60 through the concentric-circular connectors 70.

In implementations of the disclosure, since each of the light-emitting elements 12 at two ends of the lamp panel 14 can provide backlight, the preset rotation rate is greater than or equal to 12 Hz to avoid occurrence of flickering. It can be understood that the preset rotation rate may also be adjusted according to actual use conditions, which is not specifically limited in the disclosure.

Since there are a large number of light-emitting elements 12 on the lamp panel 14, in order to clearly illustrate a connection relationship between the concentric-circular connectors 70 and the light-emitting elements 12, for example, nine light-emitting elements 12 are disposed on the lamp panel 14, the transmission member 16 is a rotation column, and the following describes the connection relationship between the light-emitting elements 12 and the transmission member 16.

In a specific implementation of the disclosure, the nine light-emitting elements 12 are evenly arranged at intervals on the lamp panel 14, the lamp panel 14 is fixedly connected to the rotation column, and the rotation column is rotatably connected to the driving assembly 50. Also, ten concentric-circular connectors 70 are disposed on the rotation column, that is, the number of concentric-circular connectors 70 is one more than that of light-emitting elements 12.

To clearly distinguish the ten concentric-circular connectors and the nine light-emitting elements 12, the ten concentric-circular connectors are respectively denoted as a first concentric-circular connector to a tenth concentric-circular connector, and the nine light-emitting elements 12 are respectively denoted as a first light-emitting element to a ninth light-emitting element. In an exemplary implementation, the first concentric-circular connector electrically connects first electrodes of the nine light-emitting elements 12 to the first power-supply of the backlight driving circuit 60, and the second concentric-circular connector to the tenth concentric-circular connector electrically connect second electrodes of the nine light-emitting elements 12 to the second power-supply of the backlight driving circuit 60, respectively.

In this case, the first electrodes of the first light-emitting element to the ninth light-emitting element each are electrically connected to the first concentric-circular connector, so that the first electrodes of the nine light-emitting elements 12 are electrically connected to the first power-supply of the backlight driving circuit 60. The second electrodes of the first light-emitting element to the ninth light-emitting element are electrically connected to the second concentric-circular connector to the ninth concentric-circular connector in one-to-one correspondence, so that the second electrodes of the nine light-emitting elements 12 are electrically connected to the second power-supply of the backlight driving circuit 60.

The first electrode may be an anode of the light-emitting element 12, the second electrode may be a cathode of the light-emitting element 12, and a voltage of the first power-supply may be greater than that of the second power-supply, which is not specifically limited in the disclosure.

In implementations of the disclosure, it can be understood that, the lamp panel 14 rotates at the high speed, and partition adjustment of on/off or brightness/darkness of different light-emitting elements 12 is performed according to positions of the different light-emitting elements 12, which can achieve large-area backlight with a small number of light-emitting elements, thereby effectively reducing required costs and power consumption of the light-emitting elements 12.

Figure 2:
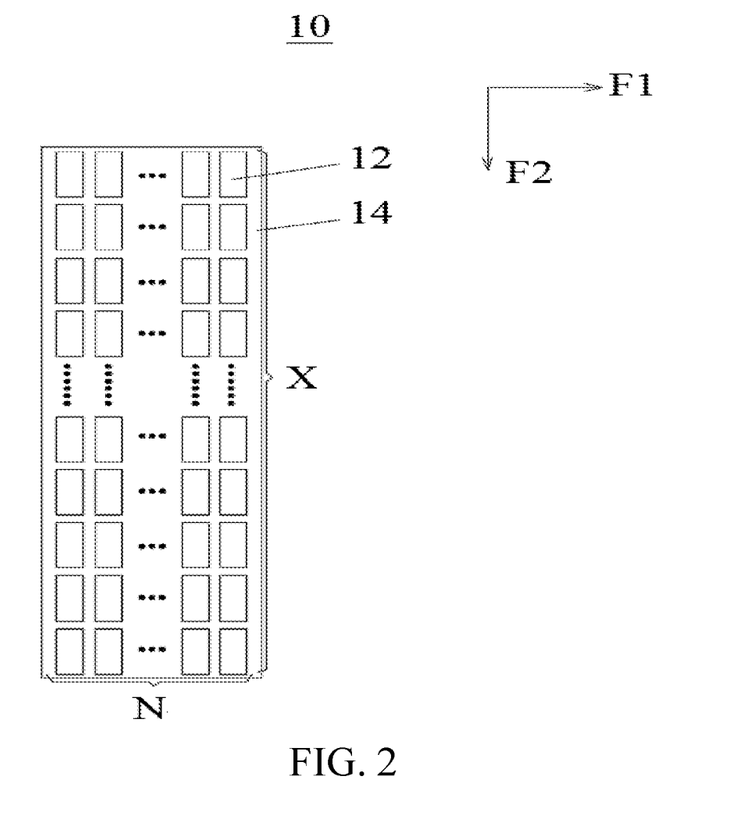
FIG. 2 is a schematic partial structural view of a backlight source from another angle disclosed in implementations of the disclosure.

Also, referring to FIG. 2, FIG. 2 is a schematic partial structural view of a backlight source 10 from another angle disclosed in the disclosure. As illustrated in FIG. 2, X rows and N columns of light-emitting elements 12 are arranged in an array on the lamp panel 14, i.e., multiple light-emitting elements 12 are arranged in an X*N array on the lamp panel 14. N light-emitting elements 12 are arranged in each row in a first direction F1, and X light-emitting elements 12 are arranged in each column in a second direction F2. A backlight driving circuit 60 of a backlight module 20 (see FIG. 3) is configured to selectively control part of the light-emitting elements 12 to emit light, to make different regions of the lamp panel 14 selectively emit light. The first direction F1 is perpendicular to the second direction F2.

In implementations of the disclosure, both X and N are positive integers greater than or equal to 1. When X is an integer greater than 1, N may be 20 to 30 times X. For example, when X is equal to 3, N may be 40, 50, 60, 63, 69, 75, 80, 90, etc. It can be understood that, X may also be 5, 7, 8, etc., and in this case, N has a corresponding new value in the foregoing value range, which is not specifically limited in the disclosure.

In implementations of the disclosure, the backlight driving circuit 60 can selectively control part of the light-emitting elements 12 to emit light, so that different regions of the display panel 30 corresponding to these light-emitting elements 12 can emit different degrees of light. The lamp panel 14 rotatably drives rotation of the light-emitting elements 12 to obtain the surface light source, which can greatly reduce costs of separately controlling light emission at different positions of the display panel 30. That is, compared with achieving light emission at different positions of a display region by separately controlling multiple light-emitting elements, in the disclosure, a small number of light-emitting elements 12 are required, and different degrees of light emission at different positions of a display region (having the same size as the display region mentioned above) can be achieved by separately controlling light emission of a small number of light-emitting elements 12, thereby greatly reducing the costs of separately controlling light emission of the light-emitting elements 12 and costs of layout of the light-emitting elements 12.

Figure 3:
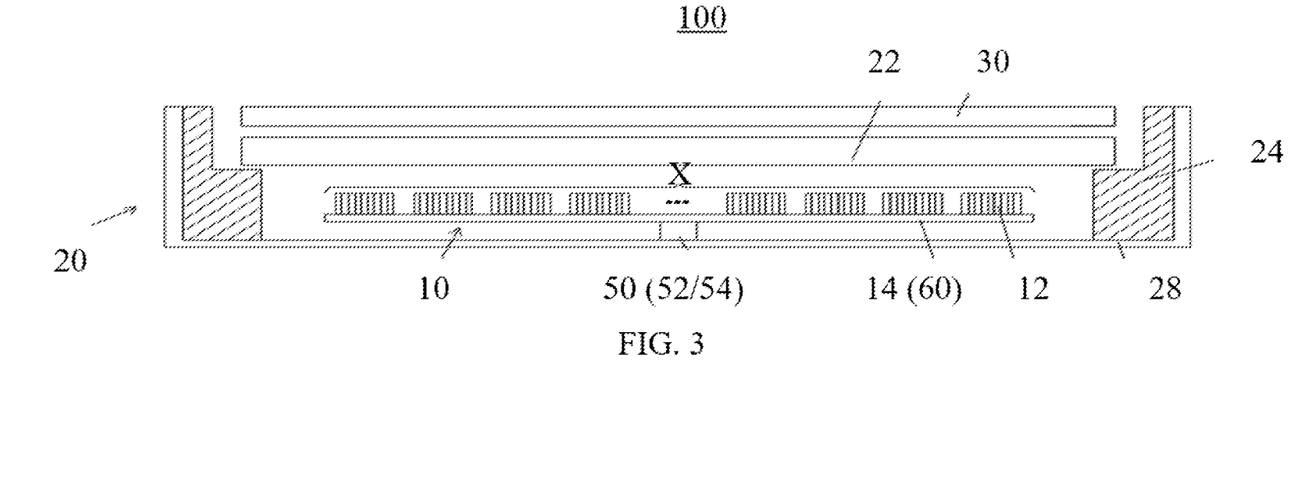
FIG. 3 is a schematic partial structural view of a display device disclosed in implementations of the disclosure.

Also, referring to FIG. 3, FIG. 3 is a schematic partial structural view of a display device 100 disclosed in the disclosure. Based on the same inventive concept, the display device 100 is further provided in the disclosure. The display device 100 includes a backlight module 20 and a display panel 30. The display panel 30 is disposed at a light-exiting side of the backlight module 20. The backlight module 20 is configured to provide for the display panel 30 light for display. The display panel 30 is configured to perform image display by emitting corresponding light according to image data to-be-displayed.

In a specific implementation of the disclosure, the display device 100 may further include other elements or assemblies, for example, a power-supply module, a signal processor module, a signal sensing module, etc., which is not specifically limited in the disclosure.

Based on the same inventive concept, a backlight module 20 is further provided in the disclosure. As illustrated in FIG. 3, the backlight module 20 at least includes an optical regulating assembly 22, a back panel 28, a driving assembly 50, and at least one backlight source mentioned above. The at least one backlight source 10 is disposed on the back panel 28. The optical regulating assembly 22 is disposed at a side of the at least one backlight source 10 away from the back panel 28. That is, the optical regulating assembly 22 is disposed at a light-exiting side of the at least one backlight source 10. The optical regulating assembly 22 is configured to regulate a light-emitting angle of the at least one backlight source 10. The driving assembly 50 is configured to drive the at least one backlight source 10 to rotate at the preset rotation rate.

In implementations of the disclosure, a distance between the optical regulating assembly 22 and the light-emitting elements 12 is required to ensure rotation of the lamp panel 14 and the light-emitting elements 12. It can be understood that the optical regulating assembly 22 is spaced apart from the at least one backlight source 10 by a preset distance. In this way, on the one hand, when the light-emitting elements 12 are driven to emit light, heat generated by the light-emitting elements 12 will not affect processing of the optical regulating assembly 22 on light emitted from the at least one backlight source 10. On the other hand, it is possible to avoid that the lamp panel 14 and the light-emitting elements 12 thereon rotating at the high speed collide with the optical regulating assembly 22, thereby avoiding that structural safety of the display device 100 is adversely affected. In addition, a support assembly 24 is used to fix the optical regulating assembly 22. Even if the optical regulating assembly 22 collapses, the optical regulating assembly 22 will not fall onto the at least one backlight source 10 rotating at the high speed, thereby effectively improving structural stability and safety of the display device 100.

In implementations of the disclosure, the optical regulating assembly 22 may include one or more of an optical film, a diffusion sheet, a reflection sheet, and a light guide plate. The optical regulating assembly 22 is configured to regulate a light-exiting angle and light-exiting quality of the at least one backlight source 10, which is not specifically limited in the disclosure.

In a specific implementation of the disclosure, the back panel 28 includes a bottom panel (not illustrated) and side panels (not illustrated). The side panels are connected to the bottom panel, for example, the side panels are connected to an edge of a periphery of the bottom panel. Therefore, the side panels are connected to the bottom panel to define a hollow back panel, that is, the back panel 28 has an accommodation space. The optical regulating assembly 22 and the display panel 30 are received in the accommodation space of the back panel 28, and the display panel 30 is disposed at a side of the optical regulating assembly 22 away from the at least one backlight source 10.

As illustrated in FIG. 3, in implementations of the disclosure, the backlight module 20 further includes a support assembly 24. The support assembly 24 is disposed on the bottom panel of the back panel 28 and adjacent to the side panel. In other words, the support assembly 24 is disposed at an edge of the bottom panel and adjacent to an inner side of the side panel. In implementations of the disclosure, the support assembly 24 is configured to adjust a distance between the optical regulating assembly 22 and the at least one backlight source 10, so that the optical regulating assembly 22 effectively regulates the light-exiting angle of the light emitted by the at least one backlight source 10.

In an implementation of the disclosure, when the backlight module 20 includes one backlight source 10, the drive assembly 50 includes a driving motor 52 (see FIG. 3). The driving motor 52 is rotatably connected to an end of the transmission member 16 away from the lamp panel 14. The driving motor 52 is configured to drive the transmission member 16 to rotate at the preset rotation rate, to make the transmission member 16 drive rotation of the lamp panel 14 of the backlight source 10.

In another implementation of the disclosure, when the backlight module 20 includes multiple backlight sources 10, the driving assembly 50 may include multiple driving motors 52. When the driving assembly 50 includes the multiple driving motors 52, each of the driving motors 52 is rotatably connected to an end of a corresponding transmission member 16 away from the lamp panel 14. Each driving motor 52 is configured to drive a corresponding transmission member 16 to rotate at the preset rotation rate, to make this transmission member 16 drive rotation of a lamp panel 14 of a corresponding backlight source 10.

In another implementation of the disclosure, when the backlight module 20 includes multiple backlight sources 10, the driving assembly 50 may further include a gear transmission set 54 and a driving motor 52 (see FIG. 3). The gear transmission set 54 may include multiple gears, and the driving motor 52 is rotatably connected to the transmission members 16 of the backlight sources 10 via the gears of the gear transmission set 54. In this case, each lamp panel 14 is rotatably connected to a corresponding gear of the gear transmission set 54 via a corresponding transmission member 16, the driving motor 52 is configured to drive the gears of the gear transmission set 54 to mesh with each other and rotate, so that the gears drive the transmission members 16 to rotate at the preset rotation rate, to make the transmission member 16 drive a corresponding lamp panel 14 to rotate at the preset rotation rate. Furthermore, the light-emitting elements 12 rotate along with the lamp panel 14 to form a surface light source.

A rotation speed of each gear of the gear transmission set 54 is determined according to specifically actual situations, which is not specifically limited in the disclosure.

It can be understood that, with a combination of the gear transmission set 54 and the driving motor 52, the gears mesh with each other to drive rotation of the multiple lamp panels 14, which is beneficial to ensuring that the multiple lamp panels 14 rotate at the same rotation speed, thereby ensuring a constant phase difference and avoiding collision.

In a specific implementation of the disclosure, the driving motor 52 may be an electric motor, such as a servo driving motor.

In a specific implementation of the disclosure, the light-emitting element 12 may be a blue light-emitting element. The optical regulating assembly 22 may further include a quantum dot (QD) film, where the QD film is used to convert blue light emitted by the light-emitting element 12 into white light.

Figure 4:
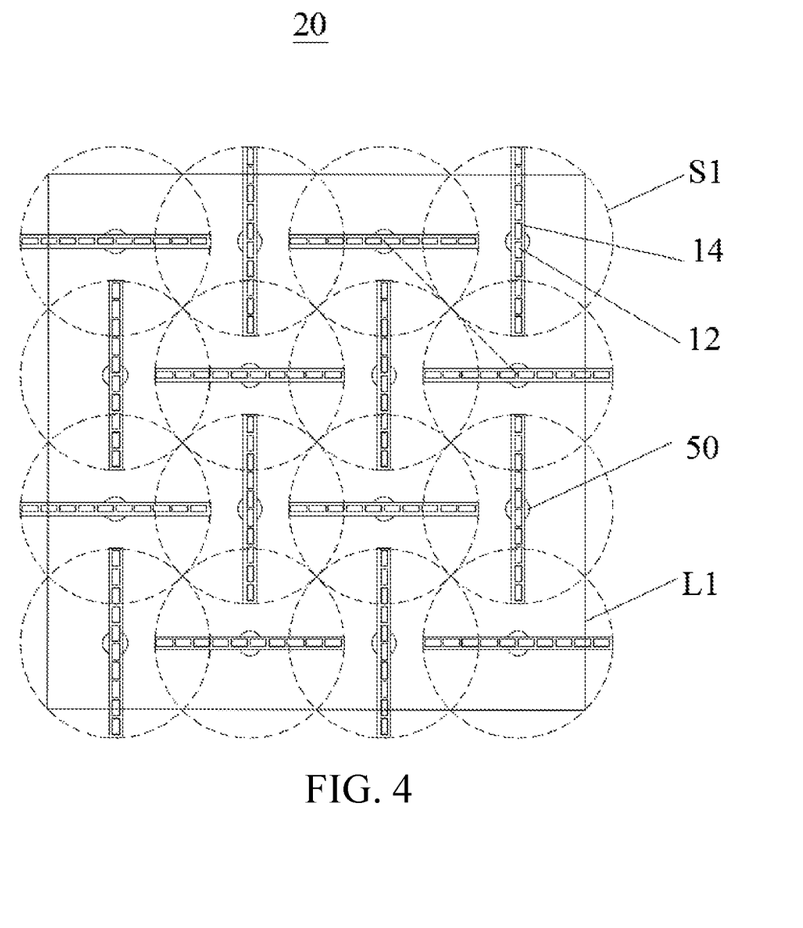
FIG. 4 is a schematic partial structural view of a backlight module disclosed in implementations of the disclosure.

Also, referring to FIG. 4, FIG. 4 is a schematic partial structural view of a backlight module 20 disclosed in the disclosure. It needs to be noted that, the number of light-emitting elements 12 on each lamp panel 14 illustrated in FIG. 3 is merely for illustration, and does not indicate the actual number of light-emitting elements 12 in the backlight source 10.

As illustrated in FIG. 4, in implementations of the disclosure, the backlight module 20 includes multiple backlight sources 10 arranged in an array, and a phase difference between two adjacent backlight sources is $\pi/2$. An interval between rotation axes of two adjacent backlight sources 10 is greater than a rotation radius of the backlight source 10, and less than or equal to $\sqrt{2}$ times (namely, root 2 times) the rotation radius of the backlight source 10, to ensure that two adjacent backlight sources 10 will not collide with each other.

When the interval between the rotation axes of two adjacent backlight sources 10 is $\sqrt{2}$ times the rotation radius of the backlight source 10, a maximum effective display region (i.e., a region defined by curve L1 in FIG. 4) is obtained. When the interval between the rotation axes of two adjacent backlight sources 10 is infinitely close to the rotation radius of the backlight source 10, a minimum effective display region is obtained.

It can be understood that the lamp panel 14 includes two sets of two opposite surfaces. The rotation axis of rotation of the backlight source 10 driven by the transmission member 16 is a normal passing through a center of a surface of the lamp panel 14 and facing the light-emitting element 12. Meanwhile, a region of the surface light source formed by rotation of the backlight source 10 is a region defined by curve Si in FIG. 4, and an interval between two adjacent rotation axes is an interval between centers of regions of surface light sources formed by rotation of two adjacent backlight sources 10.

It can be understood that the region of the surface light source formed by rotation of the backlight source 10 is in a shape of circle, and a radius of the circle is the rotation radius.

In implementations of the disclosure, each backlight source 10 forms a partition-controlled surface light source, or multiple backlight sources 10 cooperatively form a partition-controlled surface light source. In this case, the backlight driving circuit 60 of the backlight module 20 can selectively control part of the light-emitting elements 12 of each backlight source to emit light, so that the backlight module 20 can emit different degrees of light at different positions. That is, the number of backlight sources 10 for the partition-controlled surface light source can be determined according to actual situations, which is not specifically limited in the disclosure.

In implementations of the disclosure, the interval between the rotation axes of two adjacent backlight sources 10 is set to be greater than the rotation radius of the backlight source 10, and less than or equal to $\sqrt{2}$ times the rotation radius of the backlight source 10. When backlight sources 10 rotate at the preset rotation rate, regions of surface light sources formed by rotation of two adjacent backlight sources 10 are intersected, which is beneficial to further improving display efficiency of the light-emitting elements 12, reaching light brightness required by the display device 100 with a small number of light-emitting elements 12, and reducing power consumption and manufacturing costs of the display device 100.

It needs to be noted that, when the interval between the rotation axes of two adjacent backlight sources 10 is larger than $\sqrt{2}$ times the rotation radius of the backlight source 10, there is a vacant space between regions of surface light sources formed by rotation of two adjacent backlight sources 10, causing dark shadow in a display region of the display panel 30 corresponding to the vacant space, and further adversely affecting a display effect.

Figure 5:
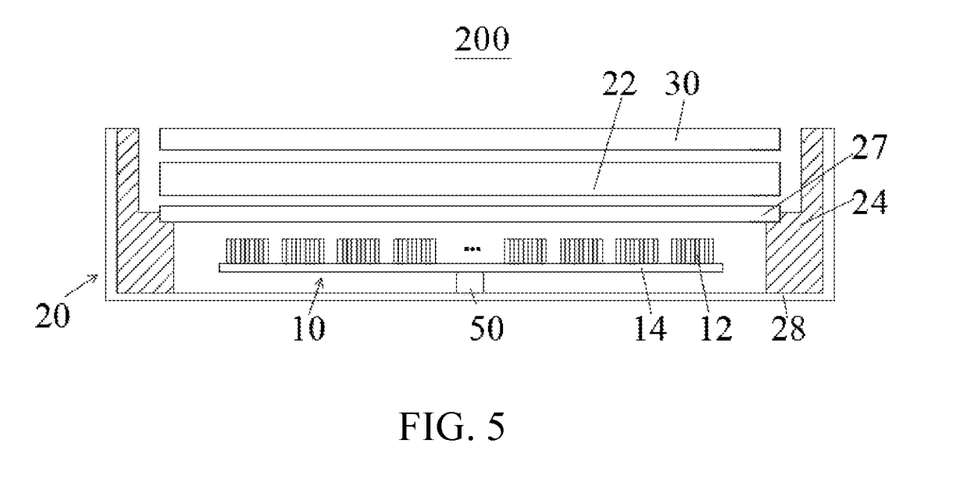
FIG. 5 is a schematic partial structural view of a display device disclosed in other implementations of the disclosure.

Also, referring to FIG. 5, FIG. 5 is a schematic partial structural view of a display device 200 disclosed in the disclosure. In implementations of the disclosure, a difference between the display device 200 illustrated in FIG. 5 and the display device 100 illustrated in FIG. 2 lies in that the backlight module further includes a structural cover 27. A cavity is defined between the structural cover 27 and the light-emitting elements 12 of the backlight source 10, to effectively prevent the optical regulating assembly 22 from touching the light-emitting elements 12 of the backlight source 10 that rotate at the preset rotation rate, thereby avoiding danger and effectively improving safety of the backlight module 20.

In this case, the structural cover 27 is disposed at the light-exiting side of the backlight source 10 and fixedly connected to the support assembly 24. The optical regulating assembly 22 is disposed at a side of the structural cover 27 away from the backlight source 10. The display panel 30 is disposed at a side of the optical regulating assembly 22 away from the structural cover 27. The structural cover 27, the optical regulating assembly 22, the support assembly 24, and the display panel 30 are received in the back panel 28.

In a specific implementation of the disclosure, the structural cover 27 may be made of an optical glass material, or made of an optical glass material and a steel mesh, which is not specifically limited in the disclosure.

Figure 6:
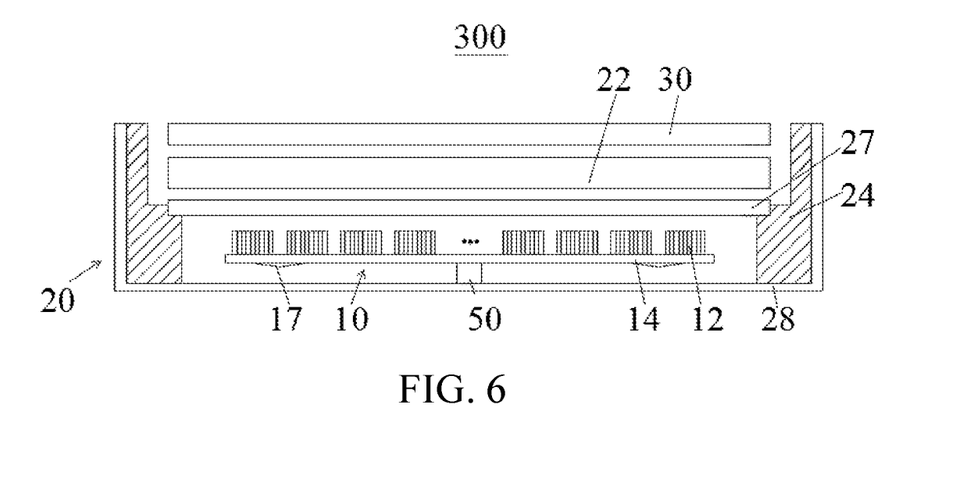
FIG. 6 is a schematic partial structural view of a display device disclosed in other implementations of the disclosure.

Also, referring to FIG. 6, FIG. 6 is a schematic partial structural view of a display device 300 disclosed in the disclosure. As illustrated in FIG. 6, a difference between the display device 300 provided in implementations of the disclosure and the display device 200 illustrated in FIG. 5 lies in that the backlight module further includes a guiding block 17. The guiding block 17 is disposed on a side surface of two opposite ends of the lamp panel 14 away from the light-emitting element 12, and the guiding block 17 is configured to transfer heat generated by the display panel 30 to the outside of the display device 300.

In a specific implementation of the disclosure, the number of guiding blocks 17 may be one, two, three, or any other numbers, which is not specifically limited in the disclosure.

In implementations of the disclosure, rotation of the guiding block 17 can make flow of air, so that the heat generated by the display panel 30 flows to the outside of the display device 300 along with the air, to achieve air-cooled cooling.

In a specific implementation of the disclosure, the display device 300 may define an opening, where the opening is configured to dissipate heat. In this case, the heat generated by the display panel 30 flows to the opening through the guiding block 17, and then is blown out of the display device 300, to achieve air-cooled cooling.

In a specific implementation of the disclosure, the guiding block 17 may be in a wedge shape, a slope shape, or the like, which is not specifically limited in the disclosure.

Figure 7:
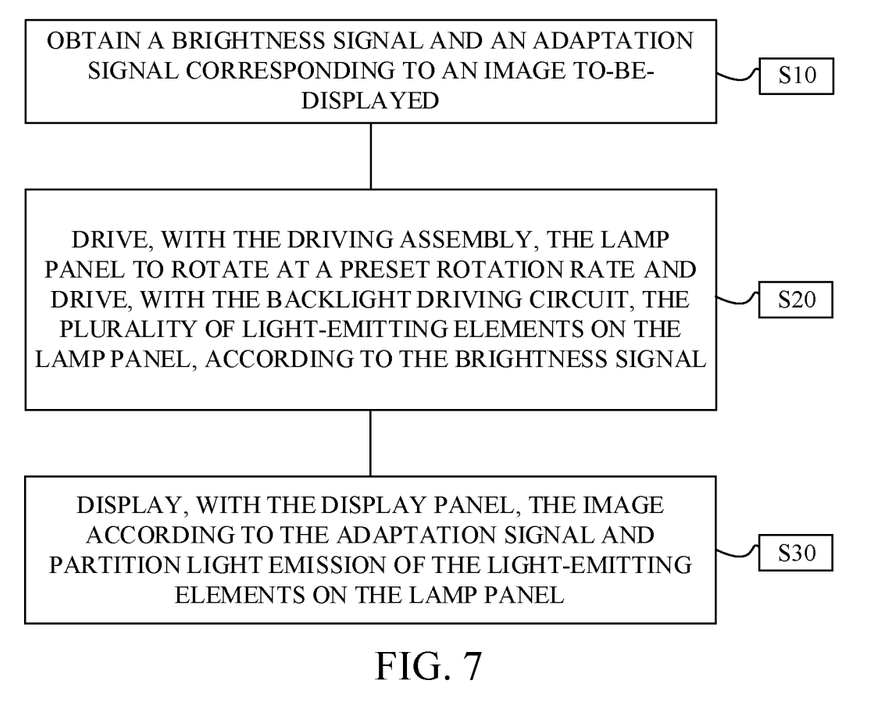
FIG. 7 is a flow chart illustrating a method for partition control disclosed in implementations of the disclosure.

Also, referring to FIG. 7, FIG. 7 is a flow chart illustrating a method for partition control disclosed in implementations of the disclosure. In implementations of the disclosure, the method for partition control is applicable to the display device of any of the implementations mentioned above and at least includes the following.

S10: obtain a brightness signal and an adaptation signal corresponding to an image to-be-displayed.

In implementations of the disclosure, the display device may include a digital system, where the digital system obtains the brightness signal and the adaptation signal corresponding to the image to-be-displayed by processing the image to-be-displayed. The adaptation signal may be a Light Crystal Display (LCD) adaptation signal.

S20, the driving assembly 50 drives the lamp panel 14 to rotate at the preset rotation rate, and the backlight driving circuit 60 of the display device selectively drives the multiple light-emitting elements 12 on the lamp panel 14 for partition light emission.

In implementations of the disclosure, the backlight module 20 may include the backlight driving circuit 60. The backlight driving circuit 60 is configured to drive, according to brightness information, timing, and position information corresponding to the light-emitting elements 12, the light-emitting elements 12 to selectively emit light, and control light brightness of the light-emitting elements 12. Meanwhile, the driving assembly 50 is configured to drive a corresponding lamp panel 14 to rotate at the preset rotation rate according to the timing and position information of the light-emitting elements 12, to further make the light-emitting elements 12 rotate at the preset rotation rate along with the lamp panel 14.

The preset rotation rate is greater than or equal to 12 Hz, which is not specifically limited in the disclosure.

S30, the display panel 30 displays an image corresponding to partition light emission, according to the partition light emission of the light-emitting elements 12 on the lamp panel 14.

In implementations of the disclosure, the display panel 30 includes an Array Substrate (AS), a color film substrate, and a liquid crystal layer sandwiched between the AS and the color film substrate. A corresponding electric field is generated between the AS and the color film substrate according to image data to-be-displayed, to control deflection angles of liquid crystal molecules in the liquid crystal layer, so that light with corresponding brightness is exited for image display.

In an implementation of the disclosure, the display panel 30 may be an LCD panel.

In this case, the backlight source 10 of the backlight module 20 provides for the display panel 30 light for display, and the display panel 30 performs image display by emitting corresponding light according to the image data to-be-displayed.

To sum up, in the backlight source, the backlight module, the display device, and the method for partition control of the disclosure, the backlight source includes the lamp panel 14 and the multiple light-emitting elements 12 disposed on the lamp panel 14. The driving assembly 50 is configured to drive the light-emitting elements 12 to rotate at the high speed, and the backlight driving circuit 60 is configured to adjust on/off or brightness/darkness of different light-emitting elements 12 according to positions of different light-emitting elements 12, to achieve large-area backlight with a small number of light-emitting elements 12 and effectively reduce manufacturing costs and power consumption of the backlight module. In this case, it is possible to reach display brightness of the display device with a small number of light-emitting elements 12, and a large number of light-emitting elements 12 are unnecessary for partition control.

All possible combinations of the various technical features in the implementations mentioned above are described, however, as long as the combination of these technical features is not contradictory, it should be considered as the recorded scope of the specification.

The reference term "an implementation", "some implementations", "an exemplary implementation", "an embodiment", "a specific embodiment", or "some embodiments" referred to herein means that a particular feature, structure, material, or characteristic described in conjunction with the implementations or embodiments may be contained in at least one implementation or embodiment of the disclosure. The exemplary expressions of the above terms appearing in the specification do not necessarily refer to the same implementation or embodiment. Furthermore, the particular feature, structure, material, or characteristic described may be properly combined in any one or more implementations or embodiments.

It can be understood that the foregoing implementations merely illustrate several implementations of the disclosure, and illustrations thereof are specific and detailed but cannot be understood as a limit to the scope of the disclosure. It needs to be noted that, for those skilled in the art, various modifications and improvements can be made without departing from the concept of the disclosure, and all these modifications and improvements belong to the scope of protection of the p disclosure. Therefore, the scope of protection of the disclosure should be subject to the appended claims.

What is claimed is:

1. A backlight module, comprising a plurality of backlight sources, wherein
    the plurality of backlight sources each comprises a lamp panel and a plurality of light-emitting elements disposed on the lamp panel and electrically connected to the lamp panel,
    the plurality of backlight sources each further comprises a transmission member, wherein the transmission member has one end directly fixedly connected to the lamp panel, the transmission member is configured to rotate so as to drive the lamp panel to rotate at a preset rotation rate, to make the lamp panel drive the plurality of light-emitting elements to rotate at the preset rotation rate, to form a surface light source, and
    wherein the plurality of backlight sources are arranged in an array, a phase difference between two adjacent backlight sources is $\pi/2$, and an interval between rotation axes of two adjacent backlight sources is greater than a rotation radius of each of the plurality of backlight sources, and less than or equal to $\sqrt{2}$ times the rotation radius of each of the plurality of backlight sources, regions of surface light sources formed by rotation of two adjacent backlight sources being intersected.

2. The backlight module of claim 1, wherein the plurality of light-emitting elements are arranged in an array on the lamp panel at intervals of a preset distance, and the preset rotation rate is greater than or equal to 12 Hz.

3. The backlight module of claim 2, wherein the plurality of light-emitting elements are arranged in an X*N array on the lamp panel, wherein X and N each are a positive integer greater than or equal to 1, and N is 20 to 30 times X.

4. A display device, comprising:
    a backlight module, configured to provide light for display and comprising an optical regulating assembly, a back panel, a driving assembly, and a plurality of backlight sources, wherein
        the plurality of backlight sources are disposed on the back panel and each comprises a lamp panel, a plurality of light-emitting elements disposed on the lamp panel and electrically connected to the lamp panel, and a transmission member, wherein the transmission member has one end directly fixedly connected to the lamp panel; the transmission member is configured to rotate so as to drive the lamp panel to rotate at a preset rotation rate, to make the lamp panel drive the plurality of light-emitting elements to rotate at the preset rotation rate, to form a surface light source; and wherein the plurality of backlight sources are arranged in an array, a phase difference between two adjacent backlight sources is $\pi/2$, and an interval between rotation axes of two adjacent backlight sources is greater than a rotation radius of each of the plurality of backlight sources, and less than or equal to $\sqrt{2}$ times the rotation radius of each of the plurality of backlight sources, regions of surface light sources formed by rotation of two adjacent backlight sources being intersected;
        the optical regulating assembly is disposed at a light-exiting side of the backlight sources of the plurality of backlight sources and configured to regulate a light-emitting angle of the backlight sources of the plurality of backlight sources; and
        the driving assembly is configured to drive the backlight sources of the plurality of backlight sources to rotate at the preset rotation rate; and
    a display panel, disposed at a light-exiting side of the backlight module.

5. The display device of claim 4, wherein each backlight source forms a partition-controlled surface light source, or a plurality of backlight sources cooperatively form a partition-controlled surface light source.

6. The display device of claim 4, wherein the plurality of light-emitting elements are arranged in an array on the lamp panel at intervals of a preset distance, and the preset rotation rate is greater than or equal to 12 Hz.

7. The display device of claim 4, wherein the driving assembly comprises a plurality of driving motors, wherein each of the plurality of driving motors is rotatably connected to an end of a corresponding transmission member away from the lamp panel, and each of the plurality of driving motors is configured to drive a corresponding transmission member to rotate at the preset rotation rate, to make the transmission member drive rotation of a lamp panel of a corresponding backlight source.

8. The display device of claim 4, wherein the backlight module comprises a plurality of backlight sources, and the driving assembly comprises a gear transmission set and a driving motor, wherein the gear transmission set comprises a plurality of gears, and the driving motor is configured to drive the gears of the gear transmission set to mesh with each other and rotate, to make each gear drive a corresponding transmission member to rotate at the preset rotation rate, and further make the transmission member drive a corresponding lamp panel to rotate at the preset rotation rate.

9. The display device of claim 4, wherein the backlight module further comprises a backlight driving circuit disposed on the lamp panel and electrically connected to the light-emitting elements of the backlight sources of the plurality of backlight sources, and the backlight driving circuit is configured to selectively control the light-emitting elements for partition light emission.

10. The display device of claim 4, wherein the backlight source comprises m light-emitting elements, and the transmission member is provided with n concentric-circular connectors, wherein m and n satisfy n=m+1.

11. The display device of claim 10, wherein each of m light-emitting elements has a first electrode and a second electrode, wherein first electrodes of the m light-emitting elements each are electrically connected to a first concentric-circular connector on the transmission member; and second electrodes of the m light-emitting elements each are electrically connected to a correspondingly concentric-circular connector of the n concentric-circular connectors other than the first concentric-circular connector.

12. The display device of claim 4, wherein the backlight module further comprises a structural cover, and the structural cover is disposed at the light-exiting side of the backlight sources of the plurality of backlight sources of the backlight module.

13. The display device of claim 4, wherein the backlight module further comprises a guiding block disposed on a side surface of the lamp panel of the backlight sources of the plurality of backlight sources, away from the light-emitting elements, and the guiding block is configured to transfer heat generated by the display panel to the outside of the display device.

14. The display device of claim 4, wherein the backlight module further comprises a support assembly, the support assembly is configured to adjust a distance between the optical regulating assembly and the backlight sources of the plurality of backlight sources.

15. A method for partition control, performed by the display device of claim 4, and the method comprising:

obtaining a brightness signal and an adaptation signal corresponding to an image to-be-displayed;

driving, with the driving assembly, the lamp panel to rotate at a preset rotation rate and driving, with the backlight driving circuit, the plurality of light-emitting elements on the lamp panel, according to the brightness signal; and displaying, with the display panel, the image according to the adaptation signal and partition light emission of the plurality of light-emitting elements on the lamp panel.

16. The method of claim 15, wherein the brightness signal comprises brightness information, timing, and position information corresponding to each of the plurality of light-emitting elements, and driving the plurality of light-emitting elements on the lamp panel according to the brightness signal comprises:

driving on/off or brightness/darkness of the plurality of light-emitting elements according to the brightness information, the timing, and the position information corresponding to each of the plurality of light-emitting elements.

17. The method of claim 15, wherein the brightness signal comprises timing and position information corresponding to each of the plurality of light-emitting elements, and driving the lamp panel to rotate at the preset rotation rate according to the brightness signal comprises:

driving the lamp panel to rotate at the preset rotation rate according to the timing and the position information corresponding to each of the plurality of light-emitting elements.

18. The backlight module of claim 1, wherein the transmission member is provided with a plurality of concentric-circular connectors, the plurality of light-emitting elements are electrically connected to a backlight driving circuit on the lamp panel through the plurality of concentric-circular connectors, and a number of the plurality of concentric-circular connectors on the transmission member is one more than a number of the plurality of light-emitting elements disposed on the lamp panel.

* * * * *